United States Patent
Hibbs et al.

(10) Patent No.: US 7,313,887 B2
(45) Date of Patent: Jan. 1, 2008

(54) COLLAPSIBLE TRAP

(75) Inventors: Derek T. Hibbs, St. Helens, OR (US); Geoffrey A. Parker, St. Helens, OR (US)

(73) Assignee: Performance Design International, Inc., St. Helens, OR (US)

( * ) Notice: Subject to any disclaimer, the term of this patent is extended or adjusted under 35 U.S.C. 154(b) by 260 days.

(21) Appl. No.: 11/148,500

(22) Filed: Jun. 8, 2005

(65) Prior Publication Data

US 2005/0268528 A1   Dec. 8, 2005

Related U.S. Application Data

(60) Provisional application No. 60/577,828, filed on Jun. 8, 2004.

(51) Int. Cl.
  *A01K 69/10* (2006.01)
  *A01K 69/06* (2006.01)

(52) U.S. Cl. ......................................... 43/105; 43/100

(58) Field of Classification Search ................ 43/105, 43/100, 102, 103
  See application file for complete search history.

(56) References Cited

U.S. PATENT DOCUMENTS

| | | | | |
|---|---|---|---|---|
| 544,100 A * | 8/1895 | Hurst | ............................ | 43/105 |
| 639,628 A * | 12/1899 | Thomsen et al. | ............... | 220/7 |
| 690,507 A * | 1/1902 | Zangenberg | ................. | 43/105 |
| 885,402 A * | 4/1908 | Thiaville | ..................... | 43/105 |
| 1,193,816 A * | 8/1916 | Ottmann | ....................... | 43/105 |
| 1,407,744 A * | 2/1922 | Ftyklo | ............................ | 43/105 |
| 1,425,567 A * | 8/1922 | Hammond | ...................... | 220/6 |
| 1,447,502 A * | 3/1923 | Asanio et al. | ................. | 43/100 |
| 1,474,087 A * | 11/1923 | Prime | ............................ | 43/100 |
| 1,516,388 A * | 11/1924 | Kruszynski | ..................... | 43/61 |
| 1,638,238 A * | 8/1927 | Brautigam et al. | ........... | 43/105 |
| 1,958,724 A * | 5/1934 | Stanislaw | ...................... | 43/105 |
| 2,163,973 A * | 6/1939 | Benca et al. | ................... | 43/100 |
| 2,238,897 A * | 4/1941 | Gomez | ......................... | 43/100 |
| 2,473,910 A * | 6/1949 | Ruiz | ............................. | 43/105 |
| 2,516,658 A * | 7/1950 | Stelly | ........................... | 43/100 |
| 2,552,007 A * | 5/1951 | Griffith | ......................... | 217/47 |
| 2,555,620 A * | 6/1951 | Wenger | ........................... | 43/61 |
| 2,602,261 A * | 7/1952 | Mann | ............................. | 43/100 |
| 2,682,130 A * | 6/1954 | Schumann, Sr. | ................ | 43/62 |
| 2,716,304 A * | 8/1955 | Taylor | ........................... | 43/100 |
| 2,740,227 A * | 4/1956 | Hatula | ............................ | 43/61 |
| 2,760,297 A * | 8/1956 | Buyken | ......................... | 43/105 |
| 2,769,274 A * | 11/1956 | Ougland | ....................... | 43/105 |
| 2,910,801 A * | 11/1959 | Safarik et al. | ................ | 43/105 |
| 3,029,546 A * | 4/1962 | Ruiz | ............................. | 43/105 |
| 3,184,881 A * | 5/1965 | Jatzeck | ......................... | 43/102 |
| 3,319,373 A * | 5/1967 | Gale et al. | ..................... | 43/100 |
| 3,373,523 A * | 3/1968 | Olafson | ........................ | 43/100 |
| 3,440,758 A * | 4/1969 | Prince | .......................... | 43/100 |

(Continued)

FOREIGN PATENT DOCUMENTS

AU   8814128 A  * 10/1988

(Continued)

*Primary Examiner*—Darren W. Ark
(74) *Attorney, Agent, or Firm*—Kolisch Hartwell, P.C.

(57) ABSTRACT

Traps, and more particularly collapsible traps used to capture crabs or other live animals. More particularly still, collapsible live animal traps that utilize one or more support members that are stable when assembled, yet easily collapsible.

21 Claims, 7 Drawing Sheets

U.S. PATENT DOCUMENTS

| | | | | |
|---|---|---|---|---|
| 3,541,721 A | * | 11/1970 | Sexauer | 43/100 |
| 3,553,881 A | * | 1/1971 | Hasseman | 43/105 |
| 3,672,090 A | * | 6/1972 | Sonntag | 43/66 |
| 3,678,612 A | * | 7/1972 | Hendrickson | 43/105 |
| 3,786,593 A | * | 1/1974 | Gerbrandt | 43/100 |
| 3,795,073 A | * | 3/1974 | Olsen | 43/105 |
| 3,913,258 A | * | 10/1975 | Souza et al. | 43/60 |
| 4,030,232 A | * | 6/1977 | Niva | 43/105 |
| 4,075,779 A | * | 2/1978 | Olafson | 43/100 |
| 4,156,984 A | * | 6/1979 | Kinser, Sr. | 43/105 |
| 4,195,436 A | * | 4/1980 | Moure | 43/100 |
| 4,221,071 A | * | 9/1980 | Sjolund | 43/100 |
| 4,354,325 A | * | 10/1982 | Aho | 43/105 |
| 4,445,295 A | * | 5/1984 | Litrico | 43/105 |
| 4,452,005 A | * | 6/1984 | Poirot | 43/100 |
| 4,587,758 A | * | 5/1986 | Ponzo | 43/105 |
| 4,604,823 A | * | 8/1986 | Ponzo | 43/105 |
| 4,654,997 A | * | 4/1987 | Ponzo | 43/105 |
| 4,706,409 A | * | 11/1987 | Downing | 43/102 |
| 4,730,411 A | * | 3/1988 | Katis | 43/105 |
| 4,765,089 A | * | 8/1988 | Rowe | 43/105 |
| 4,821,451 A | * | 4/1989 | Matson | 43/105 |
| 4,831,774 A | * | 5/1989 | Gonzalez | 43/100 |
| 4,864,770 A | * | 9/1989 | Serio | 43/105 |
| 4,982,525 A | * | 1/1991 | Miller | 43/105 |
| 5,207,017 A | * | 5/1993 | Litrico | 43/100 |
| 5,218,781 A | * | 6/1993 | Miller | 43/105 |
| 5,287,647 A | * | 2/1994 | Longo | 43/105 |
| 5,331,763 A | * | 7/1994 | Miller | 43/105 |
| 5,478,273 A | * | 12/1995 | Ives | 43/100 |
| 5,625,978 A | * | 5/1997 | Streeper et al. | 43/105 |
| 5,632,114 A | * | 5/1997 | McKenzie | 43/105 |
| 5,771,627 A | * | 6/1998 | Mattson et al. | 43/100 |
| 5,839,220 A | * | 11/1998 | Wass | 43/105 |
| 5,862,624 A | * | 1/1999 | Askins | 43/61 |
| 5,924,237 A | * | 7/1999 | Ives | 43/100 |
| 5,943,812 A | * | 8/1999 | Pizzolato | 43/100 |
| 6,493,985 B2 | * | 12/2002 | Matches et al. | 43/105 |
| 6,550,180 B1 | * | 4/2003 | Le | 43/105 |
| 2006/0112610 A1 | * | 6/2006 | Philbrook | 43/105 |
| 2006/0288634 A1 | * | 12/2006 | Wimbus et al. | 43/105 |

FOREIGN PATENT DOCUMENTS

| | | | |
|---|---|---|---|
| AU | 2004200009 A1 | * | 7/2005 |
| CA | 2268249 A1 | * | 10/2000 |
| EP | 1371286 A2 | * | 12/2003 |
| FR | 2560004 A1 | * | 8/1985 |
| FR | 2775871 A1 | * | 9/1999 |
| GB | 2209262 A | * | 5/1989 |
| GB | 2396092 A | * | 6/2004 |
| JP | 7-313016 A | * | 12/1995 |
| JP | 2006-197801 A | * | 8/2006 |
| NZ | 530555 A | * | 8/2004 |
| TW | 413618 A | * | 12/2000 |

* cited by examiner

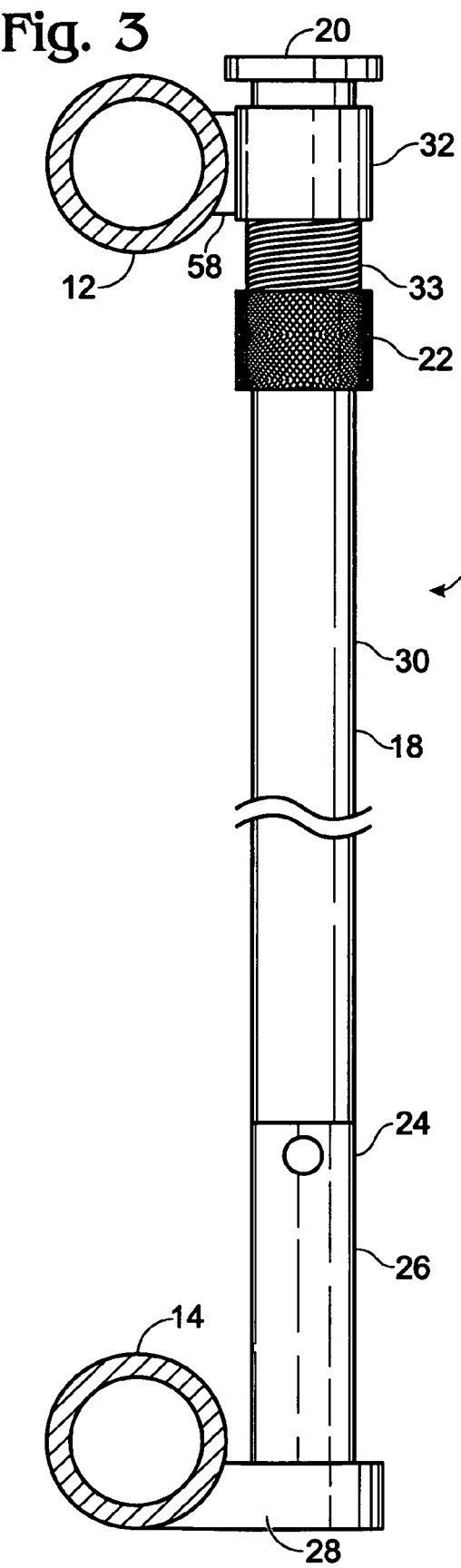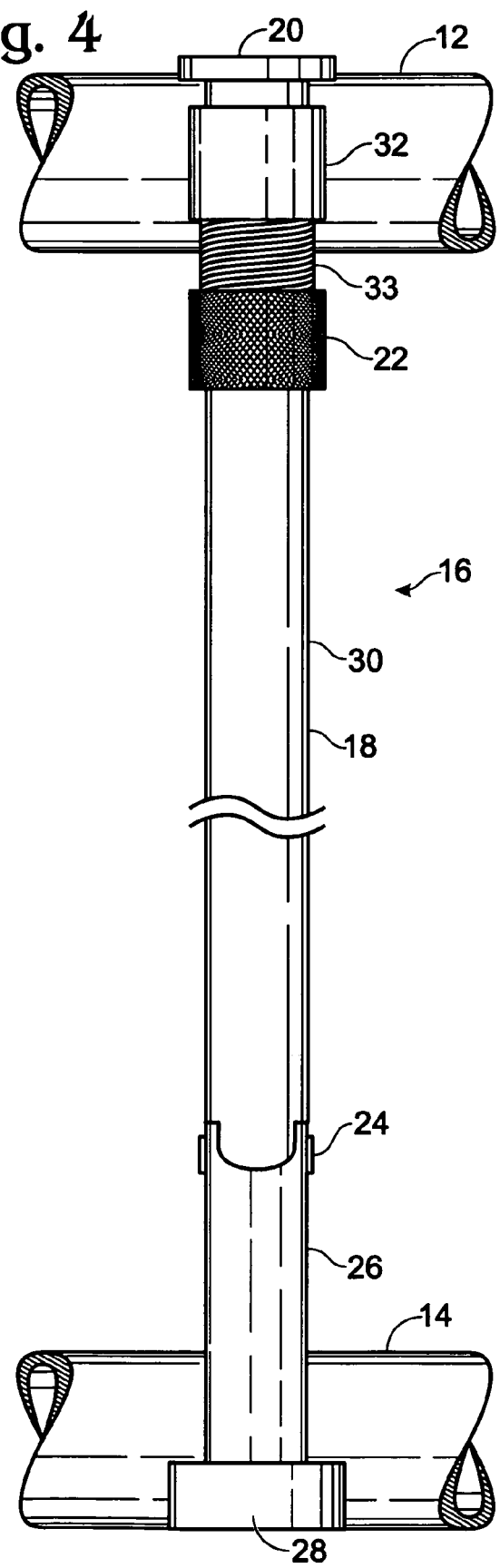

COLLAPSIBLE TRAP

CROSS-REFERENCE TO RELATED APPLICATION

This application claims priority from copending U.S. Provisional Patent Application Ser. No. 60/577,828, which was filed on Jun. 8, 2004 and entitled "Collapsible Crab Trap," the completed disclosure of which is incorporated herein by reference for all purposes.

TECHNICAL FIELD

The present invention relates to traps, and more particularly to collapsible live animal traps used to capture crabs and other shellfish. More particularly still, the invention relates to live animal traps that utilize one or more support members that are stable when assembled, yet easily collapsible.

BACKGROUND

Crab pots and traps are used both commercially and recreationally to capture crabs and other shellfish. They typically function by luring the target through a "tunnel" and into the pot with some type of bait, and then preventing exit by some means such as a unidirectional gate, also known as a "trigger" mechanism.

One system for trapping crabs is provided by U.S. Pat. No. 2,716,304 to Taylor, which discloses a trap including upper and lower circumferential rings that are separated by a plurality of substantially vertical stays. The stays are fixedly attached to the lower ring, and removably attached to the upper ring using a u-shaped clip portion of each stay to engage a portion of the upper ring. Unfortunately, such u-shaped and similar clip-on stays may be accidentally detached in a variety of circumstances, leading to unwanted collapse of the trap. Furthermore, the clip portions of the stays may be relatively weak, possibly leading to partial collapse of the trap even when the stays do not become accidentally detached.

Another shortcoming of existing crab traps involves the collapsibility of the entry tunnel and unidirectional gate (or trigger) of the trap. In many existing traps, the tunnels and triggers are not configured to collapse smoothly along with other portions of the trap, resulting in possible interference between various parts of the trap and difficulty in collapsing the trap. Some existing traps attempt to coordinate collapse of the tunnel and/or trigger with collapse of the other portions of the trap. For example, the system provided by U.S. Pat. No. 2,760,297 to Buyken discloses a collapsible trap having a curved unidirectional gate, the curvature of which causes it to collapse along with the entry tunnel of the trap. However, the free ends of the gates in such systems are prone to interference by trapped crabs, possibly causing damage to the crabs, allowing crabs to escape, and/or causing unwanted collapse of the trap.

Yet another shortcoming in prior art crab traps relates to the structure of the side netting used in such traps. Typically, this netting includes interwoven horizontal and vertical strands that either are knotted together at their points of intersection, or that slide freely relative to each other in both the horizontal and vertical directions. In practice, each of these configurations can result in unwanted entanglements of the netting with other portions of the trap when the trap is collapsed and reassembled.

In view of the shortcomings in the prior art described above, a need exists for a collapsible crab trap having improved stability when assembled, yet which may be easily collapsed and reassembled in a coordinated manner.

BRIEF DESCRIPTION OF THE FIGURES

FIG. 3 is a partial side sectional view showing a collapsible support member attached to upper and lower perimeters of a crab trap, according to aspects of the present disclosure.

FIG. 4 is a partial front elevational view of the collapsible support member and perimeters of FIG. 3.

DETAILED DESCRIPTION

Figure 1:
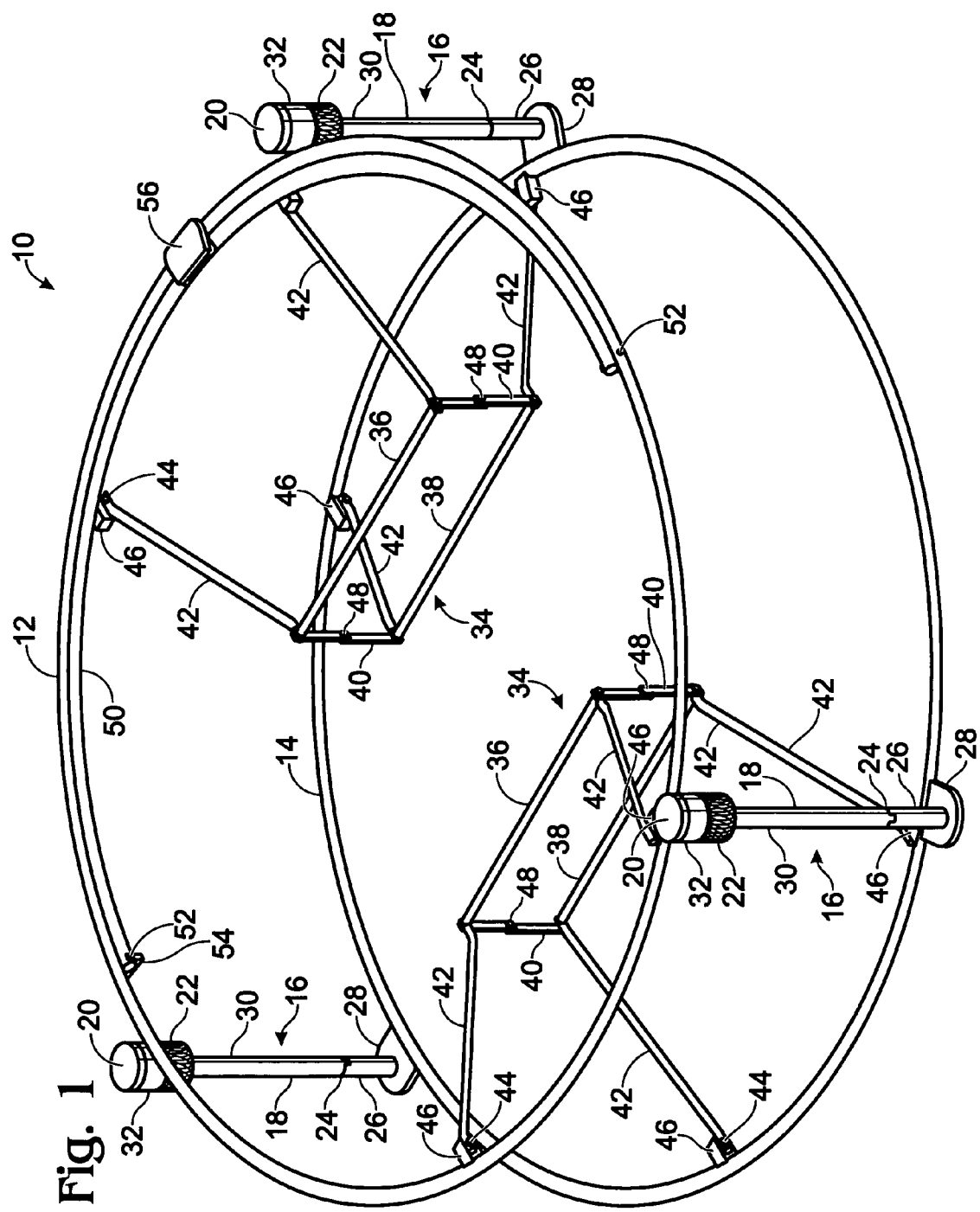
FIG. 1 is a perspective view showing an assembled crab trap with its netting and harvest door removed, according to aspects of the present disclosure.

FIG. 1 shows a collapsible crab trap 10 in a partially assembled state, according to an embodiment of the present invention. Trap 10 includes an upper perimeter 12, a lower perimeter 14, and a plurality of collapsible legs 16 disposed around the periphery of the trap. For clarity, trap 10 is shown with its trigger mechanisms and top, bottom, and side walls removed, but in general these walls will be in place when the trap is fully assembled and ready for practical operation, so as to prevent escape of captured crabs or other creatures.

In the depicted embodiment, each perimeter—and thus the trap as a whole—has a circular cross section. More generally, however, traps according to the present disclosure may be configured to have various shapes, such as elliptical, rectangular, or square shapes, among others. The structural portions of the trap depicted in FIG. 1 may be constructed from any suitable material, including metals such as aluminum, steel, or various metal alloys; and plastic materials including polyvinylchloride (PVC) and other sturdy composite materials.

Each collapsible leg 16 of trap embodiment 10 includes an elongate support member 18, a head portion 20, a hollow engagement portion 22, and a hinge mechanism 24. A lower, or proximal portion 26 of each leg attaches to a base portion 28, which is connected to lower perimeter 14 in a secure fashion, such as by welding or by integral formation with the lower perimeter. An upper, or distal portion 30 of each elongate support member is configured to pass through a sleeve 32 that is securely connected to upper perimeter 12, for instance by welding or by integral formation with the upper perimeter.

Each sleeve 32 is sized to allow passage of elongate support member 18 of the collapsible leg, but to prevent passage of head portion 20 of the leg. When the trap is in its assembled position, engagement portion 22 of each leg is configured to slide along the corresponding support member and may be engaged with distal portion 30 of the corresponding support member, in a manner that will be described in more detail below. However, engagement portion 22 is sized to prevent its passage through sleeve 32, so that when the engagement portion is engaged with the distal portion of the support member, it holds sleeve 32 in proximity to head portion 20 of the corresponding leg. The legs thus may be collectively configured to hold the upper perimeter of the trap at a substantially fixed distance from the lower perimeter of the trap.

In addition to sliding engagement portion 22, the invention also contemplates other methods of engaging the elongate support member of the leg with the sleeve attached to the upper perimeter. For example, the sleeve may have a solid top surface (not shown) configured to rotate into and out of position, and the distal portion of the support member may engage with the sleeve simply by passing into the sleeve and being held in position by the top surface of the sleeve. To collapse the trap, the solid top surface of the sleeve may be rotated out of position, allowing the support member to pass through the sleeve.

Alternatively, the trap may include a clamp mechanism such as a set screw or a quick-release lever configured to clamp the sleeve around the leg to hold the trap in a securely assembled position. To collapse the trap, the clamp mechanism is loosened, allowing the support member of the leg to pass through the sleeve. In general, any engagement mechanism is suitable which securely engages the support member with the sleeve so as to hold the upper perimeter of the trap at a substantially fixed distance from the lower perimeter.

Trap 10 also includes a pair of collapsible tunnels 34. Each tunnel 34 includes a top member 36, a bottom member 38, a pair of side members 40, and a plurality of attachment members 42 for attaching the tunnel to the upper and lower perimeters. Attachment members 42 may be rotationally connected to the upper and lower perimeters, for example, by rivets 44, or by any other suitable mechanism such as hinges, pins, or the like. As depicted in FIG. 1, the attachment members each may be rotationally connected to a support block 46, rather than directly to the upper and lower perimeters. The support blocks may be fixedly attached to the upper and lower perimeters by welding, gluing, or any other suitable means. Each side member 40 further may include a hinge mechanism 48 that allows the side member to bend or fold into two substantially parallel segments when the trap is collapsed, in a manner that will be described in greater detail below.

Trap 10 also may include a door portion 50, which typically is configured to be rotatable into and out of a plane defined by the upper perimeter. In FIG. 1, the door portion takes the form of a semicircular section of tubing that is attached to upper perimeter 12 with a pair of rotatable pins 52. At each attachment point, a support bracket 54 may be securely attached to the upper perimeter, e.g. by welding or soldering, and may provide further stability to the door portion. The door portion in this embodiment also includes an attached stop 56, which prevents the door portion from rotating into the interior of the assembled trap. The operation of the door portion will be described in greater detail below.

Figure 2:
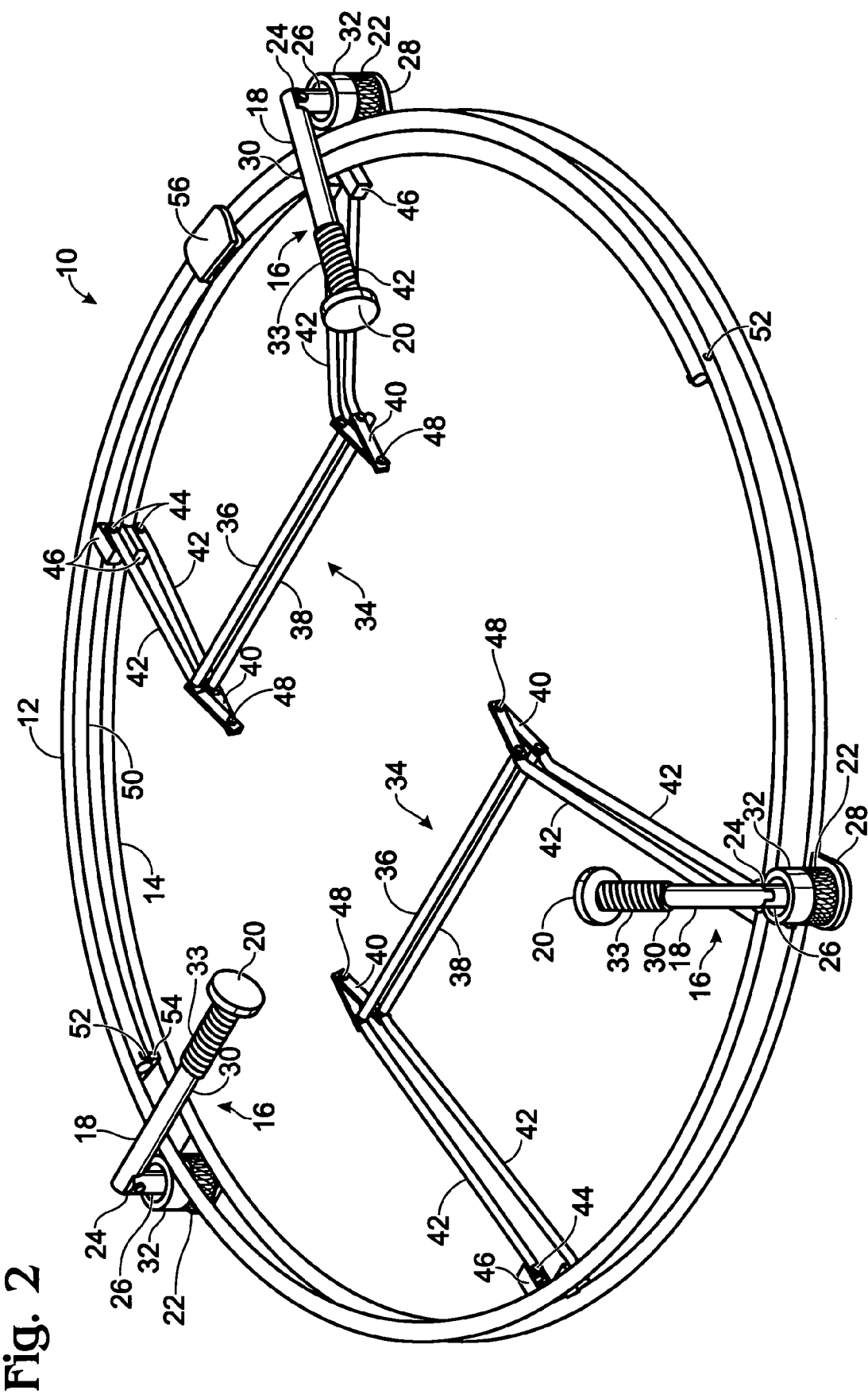
FIG. 2 is a perspective view of the crab trap of FIG. 1, showing the trap of FIG. 1 collapsed.

Trap 10 is shown in its collapsed state in FIG. 2, again with its top, bottom and side walls removed for clarity. As FIG. 2 depicts, when the trap is collapsed, engagement portion 22, which may be internally threaded, is disengaged from threads 33 of distal portion 30 of the corresponding elongate support member, allowing the engagement portion to move along the support member until it is positioned below hinge mechanism 24 (i.e., between the lower perimeter and the hinge mechanism). This allows sleeve 32 to move away from head portion 20 of the leg, which causes the upper perimeter of the trap to move towards the lower perimeter. When sleeve 32 is positioned below hinge mechanism 24, the upper and lower perimeters of the trap will be relatively close together, defining a common plane. At this point, the legs may be folded over—typically in either a radial direction (as indicated in FIG. 2) or a tangential direction (not shown)—so that the distal portions of the support members lie substantially in the plane defined by the upper and lower perimeters.

As FIG. 2 shows, tunnels 34 also collapse as the upper and lower perimeters are brought together. The rotational attachment of attachment members 42 to the upper and lower perimeters allows those members to rotate as the trap is collapsed, while hinge mechanisms 48 allows each side member 40 to bend or fold into two substantially parallel segments. Thus, as FIG. 2 indicates, the attachment members, side members, and top and bottom members of the tunnels all may be positioned substantially in the plane defined by the upper and lower perimeters when the trap is collapsed. This allows convenient transportation and storage of the trap when it is not in use.

FIGS. 3 and 4 are close-up views of one of collapsible legs 16 while trap 10 is partially assembled, showing in more detail how the legs operate to securely hold the upper and lower perimeters of the trap at a substantially fixed distance from each other. FIG. 3 shows a tangential cross section of a portion of the trap, and FIG. 4 shows a radial view of the same portion of the trap. As indicated at 33, distal portion 30 of support member 18 of the leg may be externally threaded. In this case, engagement portion 22 of the leg may be internally threaded in a complementary manner, to rotationally engage the distal portion of the support member.

Engagement portion 22 is sized to prevent its passage through sleeve 32 of the trap. Thus, when engagement portion 22 is rotated into greater engagement with threaded distal portion 30, it contacts sleeve 32, and causes the sleeve to move towards head portion 20 of the leg. Since, as indicated at 58, sleeve 32 is secured to upper perimeter 12 by welding, soldering, gluing, or the like, this also causes upper perimeter 12 to move away from lower perimeter 14 of the trap. After sufficient rotation of the engagement portion, sleeve 32 may be pressed against head portion 20 so that no further movement of the sleeve is possible, and the upper perimeter will be securely held at a substantially fixed distance from the lower perimeter. When this step has been accomplished for each leg, the trap will be in an assembled state.

To collapse the trap, engagement portion 22 of each leg is rotated in the direction opposite the direction used to tighten it, thus loosening the engagement portion until it disengages from threads 33 of the leg. This allows the engagement portion to slide down the leg until it is below hinge mechanism 24. When the engagement portion of each leg is disengaged in this manner, the upper perimeter of the trap will be free to move towards the lower perimeter. When the upper and lower perimeters are brought sufficiently close together so that sleeves 32 and engagement portions 22 are disposed between hinge mechanisms 24 and the lower perimeter, the legs may be collapsed into the common plane of the perimeters as indicated in FIG. 2 and as described above.

Figure 5:
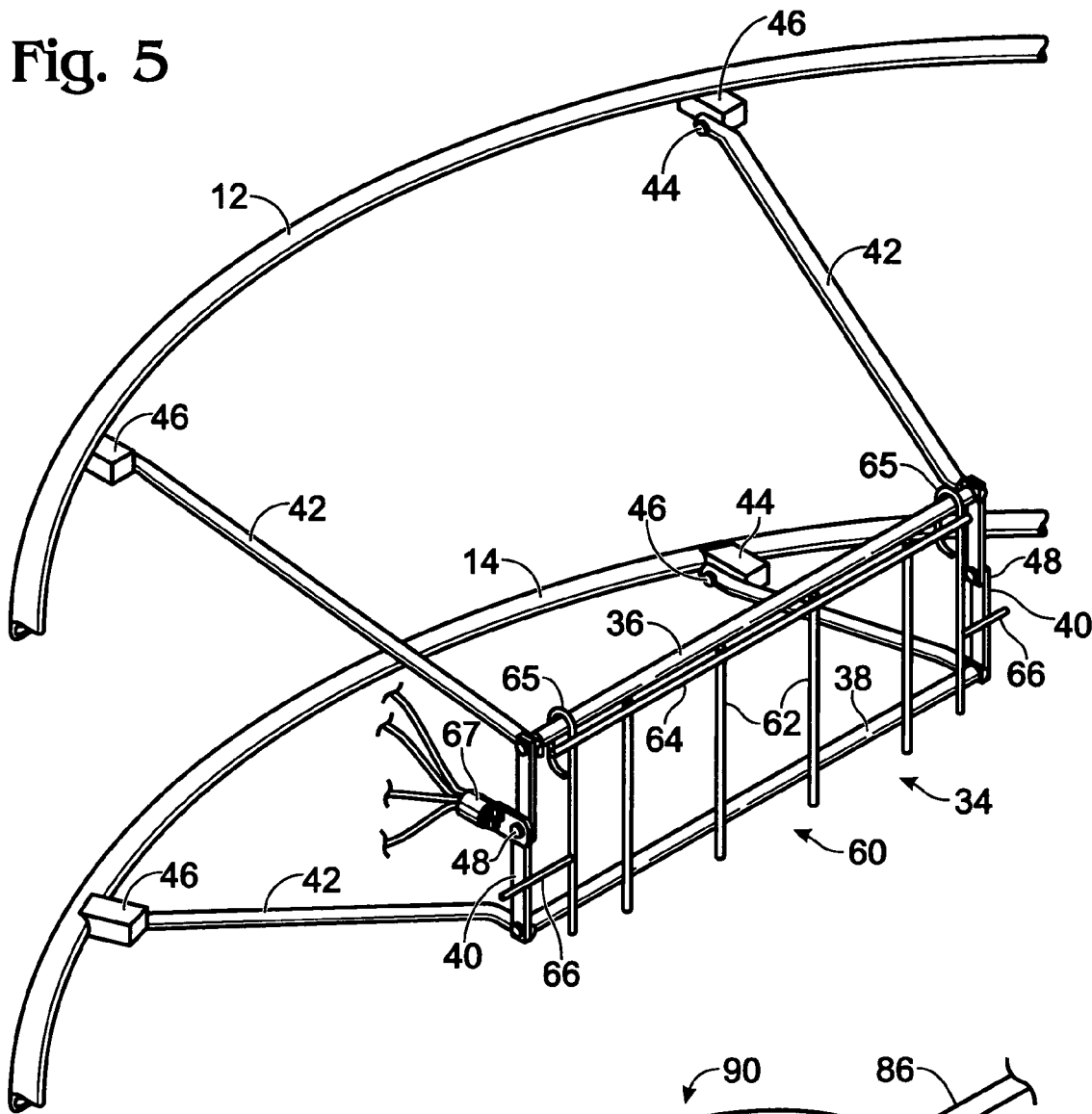
FIG. 5 is a partial perspective view of a collapsible tunnel and trigger mechanism attached to upper and lower perimeters of a crab trap, according to aspects of the present disclosure.

FIG. 5 shows a close-up view of one of collapsible tunnels 34, including a gate 60, also known as a trigger mechanism, attached to top member 36 of the tunnel. Gate 60 typically is unidirectional, i.e. it can be opened in an inward direction (towards the center of the trap), but not in an outward direction. This allows crabs and other desired animals to pass into the trap from the outside, but prevents them from escaping through the gate once trapped. As FIG. 5 indicates, gate 60 may include a plurality of longitudinal members 62, spaced laterally apart by a distance less than the typical dimension of an animal whose escape it is desired to prevent. Longitudinal members 62 may be joined by a cross member 64 to which they are securely attached, for example, by welding, soldering, or any other suitable attachment method.

Gate 60 may be attached to top member 36 of the tunnel with curved segments 65 of the longitudinal members 62, which may be partially or completely wrapped around the top member as indicated. This allows the gate to rotate inward, permitting ingress of desired animals. However, one or more of the longitudinal members may be greater in length than the length of side members 40 of the tunnel so as to overlap bottom member 38, preventing the gate from rotating outward past the plane defined by the top, bottom, and side members of the tunnel, and thus preventing egress of trapped animals.

Gate 60 also may include one or more laterally extending members 66. The laterally extending members may extend sufficiently far so that they contact one of side members 40 when the gate is in a closed position. Thus, when the trap is collapsed and side members 40 fold at hinge mechanisms 48, each side member will urge the corresponding laterally extending member inward, causing the entire gate to rotate. Thus, as the tunnel is collapsed into the common plane defined by the upper and lower perimeters, the gate also will be automatically moved substantially into that same plane by the force of the side members on the laterally extending members. This further facilitates smooth collapse of the trap.

FIG. 5 also shows a wirekeeper mechanism 67 attached to one of side members 40, and which may be used in some embodiments to help prevent some of the wire strands of the trap from becoming entangled. Although for clarity, only one wirekeeper is shown, in general a similar mechanism may be attached to each side member. As indicated, the wirekeeper mechanism may be bolted or otherwise attached to side member 40, and may be configured to accept multiple strands of wire or netting, which then may be attached to the wirekeeper by crimping, soldering, or any other suitable method.

The multiple strands attached to the wirekeeper mechanism may provide a portion of the side netting of tunnel 34, and may be attached to the upper and lower perimeters of the trap, or to other strands of side wall netting, among others. When the trap is collapsed, the hinged rotation of side member 40 causes wirekeeper 67 to be drawn inward towards the center of the trap, providing tension to the attached strands, and helping to prevent them from becoming entangled as the trap is collapsed and reassembled.

Figure 6:
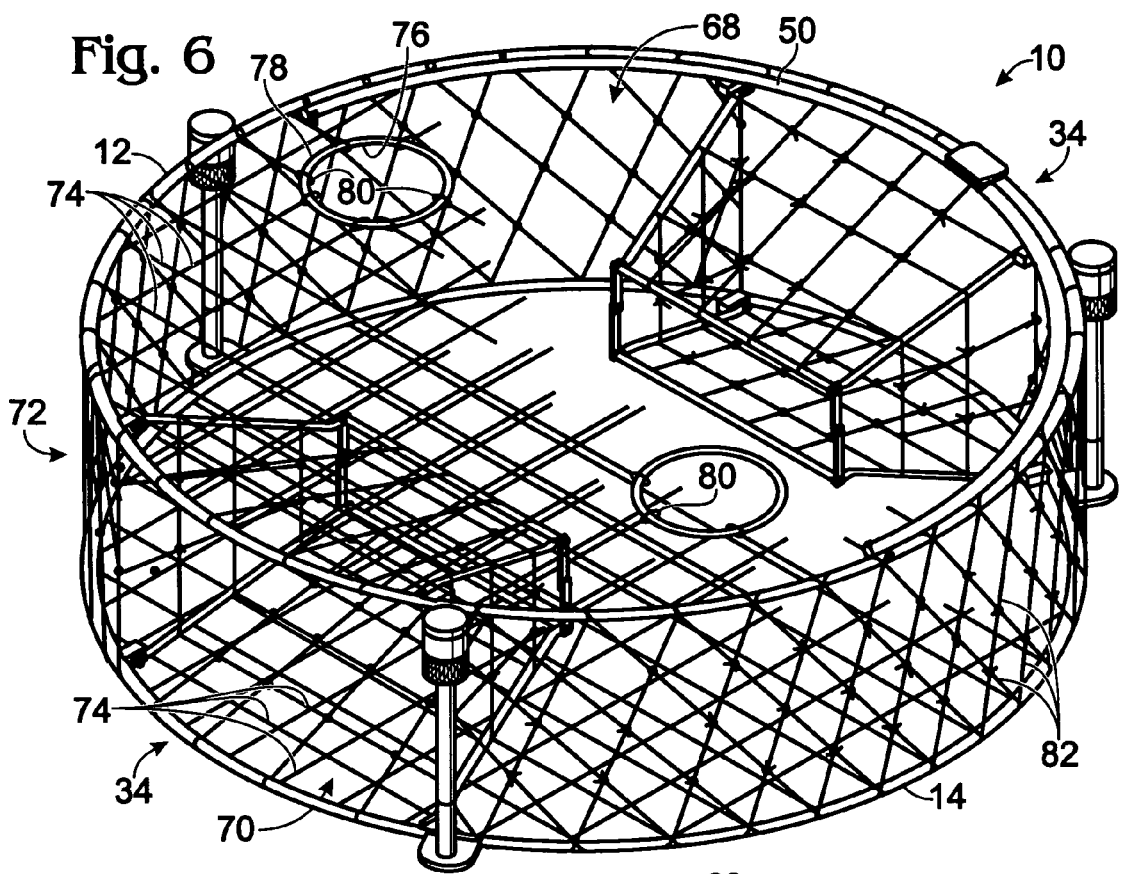
FIG. 6 is a perspective view of an assembled collapsible crab trap with its netting and harvest door attached, but with the top and bottom walls partially cut away for clarity, according to aspects of the present disclosure.

FIG. 6 shows trap 10 in a fully assembled state, including a screened top wall 68, a screened bottom wall 70, and a collapsible screened side wall 72. For clarity, the top and bottom walls are shown partially cut away, so that part of the side wall and the netting around one of the tunnels of the trap may be seen unobstructed. The top and bottom walls generally may be formed from a plurality of crossed strands 74, which may be constructed, for example, from metal wire, nylon, plastic, or any other suitable material. In general, the screened walls of the trap are constructed to create apertures that allow passage of animals having less than a particular size, while preventing passage (and thus escape) of animals having greater than a particular size. Strands 74 forming bottom wall 70 may be attached securely to bottom perimeter 14 at a plurality of locations spaced around the perimeter. The strands may be attached to the perimeter, for example, by soldering, by wrapping the strands around the perimeter, or by threading the strands through apertures in the perimeter, which may be hollow to accommodate this method of attachment.

In some embodiments, the perimeters of the trap may be hollow, and some or all of strands 74 may be attached to one of the perimeters by entering the perimeter through an aperture, and then being secured by screws or bolts screwed into the perimeter so as to frictionally secure the strands against the interior of the perimeter. For example, a strand may enter one of the perimeters through an aperture in the perimeter that faces radially inward, and then a screw or bolt may be screwed into another aperture in the perimeter that faces in an orthogonal direction, until the screw or bolt pushes the free end of the strand against the opposite side of the interior of the perimeter and securely holds it there. This method of attachment allows individual strands to be replaced or repaired without removing all of the strands of the associated top or bottom wall of the trap.

Similarly, the strands forming top wall 68 are securely attached to upper perimeter 12 at a plurality of locations. However, the strands of the top wall are attached to the semicircular tubing of door 50 around approximately one half of the upper periphery, to form a portion of the top wall that may be opened by pulling upward on door 50, allowing access to the interior of the trap. Top wall 68 also includes one or more circular apertures 76, which are sized to allow prey of less than particularly chosen dimensions to escape the trap. For example, apertures 76 may be approximately between 2 inches and 4 inches in diameter. Apertures 76 each may be formed by a rigid metal ring 78, to which strands 74 may be attached using loops 80 formed from the strand material and wrapped around the metal rings.

Side wall 72 is collapsible, and generally also may be formed from a plurality of crossed strands 82. Strands 82 of the side wall are typically constructed of a flexible material such as stainless steel wire, nylon, plastic, or the like, to facilitate collapse of the side wall. Strands 82 may be knotted together at their intersection points, to form a plurality of apertures which are smaller than the size of the desired prey, to prevent escape of the prey through the side wall. Strands 82 may be attached to the upper and lower perimeters of the trap by any secure method of attachment, such as by using screws or bolts to secure the strands within the perimeters as described above, or by wrapping the strands around the perimeters and knotting them. In the vicinity of the tunnels, the strands of the side wall may extend between the connecting members 42 of the tunnel rather than between the perimeters, to allow prey to pass into the trap through the tunnels.

Figure 7:
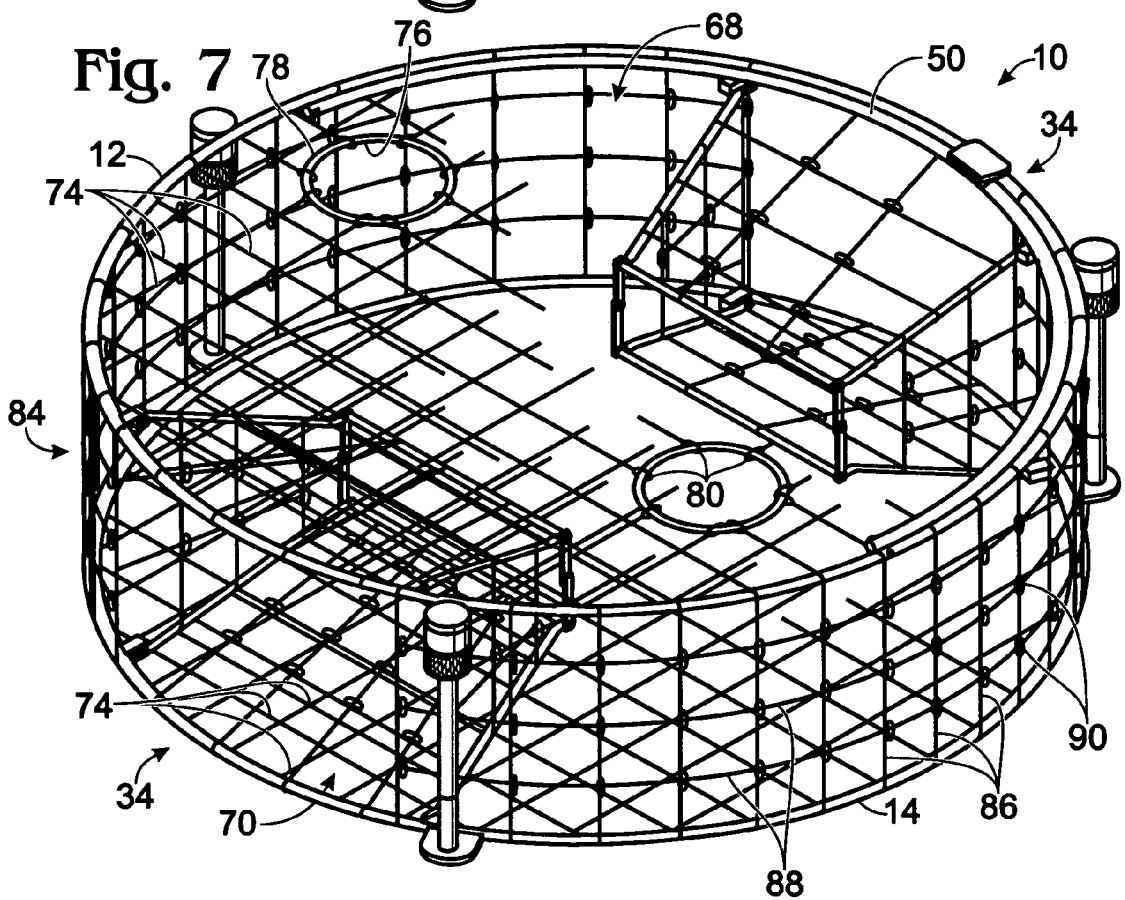
FIG. 7 is a perspective view of an assembled collapsible crab trap with an alternative form of netting and harvest door attached, but with the trigger mechanisms removed and the top and bottom walls partially cut away for clarity, according to aspects of the present disclosure.

FIG. 7 shows trap 10 with an alternate side wall 84, which is formed from a plurality of crossed strands 86, 88. As in FIG. 6, the top and bottom walls are shown partially cut away in FIG. 7, so that part of the side wall and the netting around one of the tunnels of the trap may be seen unobstructed. Like strands 82 of side wall 72, the strands of side wall 84 are formed from a flexible material such as metal wire or plastic. However, unlike strands 82, strands 86 and 88 are not knotted together. Instead, strands 86, which extend substantially vertically between upper and lower perimeters 12 and 14, form a plurality of loops 90, through which substantially horizontal strands 88 pass. This configuration provides strands 86 a degree of freedom with respect to strands 88; i.e., strands 86 may slide along strands 88, although the amount of such sliding may be limited by tension in the strands 86, due to their fixed connections with the upper and lower perimeters. On the other hand, strands 88 are in substantially fixed relation to each other, because loops 90 are not free to move along the strands 86.

To provide a degree of freedom between the strands in a similar but alternate manner (not shown), strands 88 may form loops through which the strands 86 pass. Furthermore, to provide rotational freedom between the vertical and horizontal strands at the intersection points of the strands without providing a sliding degree of freedom, both vertical strands 86 and horizontal strands 88 may form a plurality of intersecting loops, with each loop formed in the manner shown in FIG. 8. This configuration of intersecting loops may provide the same aperture stability as traditional, knotted netting, while allowing each segment of the netting to rotate freely, which may lead to fewer entanglements than using knots at the intersection points. In some embodiments, the vertical and horizontal strands may intersect with a sliding degree of freedom in some regions of the trap, rotational freedom in other regions of the trap, and in standard knotted fashion in still other regions, or using any desired combination of these intersection methods.

Figure 8:
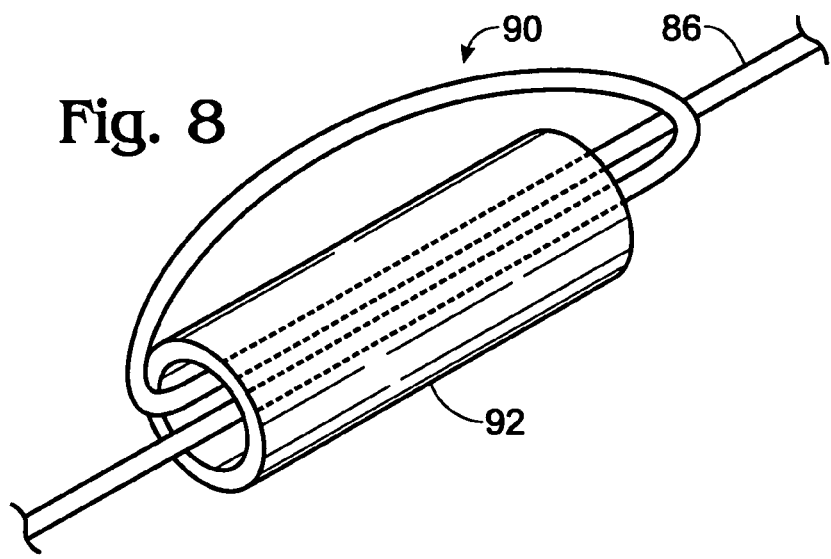
FIG. 8 is a magnified view showing the structure of the side wall netting of the trap of FIG. 7 in more detail.

FIG. 8 shows in greater detail how a loop 90 may be constructed from one of strands 86 (or horizontal strands 88) of the side wall. To form the loop, the strand may be passed through a hollow sleeve 92, doubled back, and then passed through the sleeve a second time. The sleeve may be constructed from any suitable material, such as metal or plastic, and its diameter may be chosen in relation to the diameter of strands 86 such that the sleeve is held substantially fixed in place along the strand by friction. As described previously, this fixes the locations of loops 90, so that strands 86 have a degree of freedom to slide along strands 88, but the spacing of strands 88 is constrained by the fixed locations of the loops. This configuration may allow the strands of the side wall to reposition themselves as the trap is collapsed, leading to relatively fewer entanglements of the side wall, and thus to more convenient operation of the trap.

Figure 9:
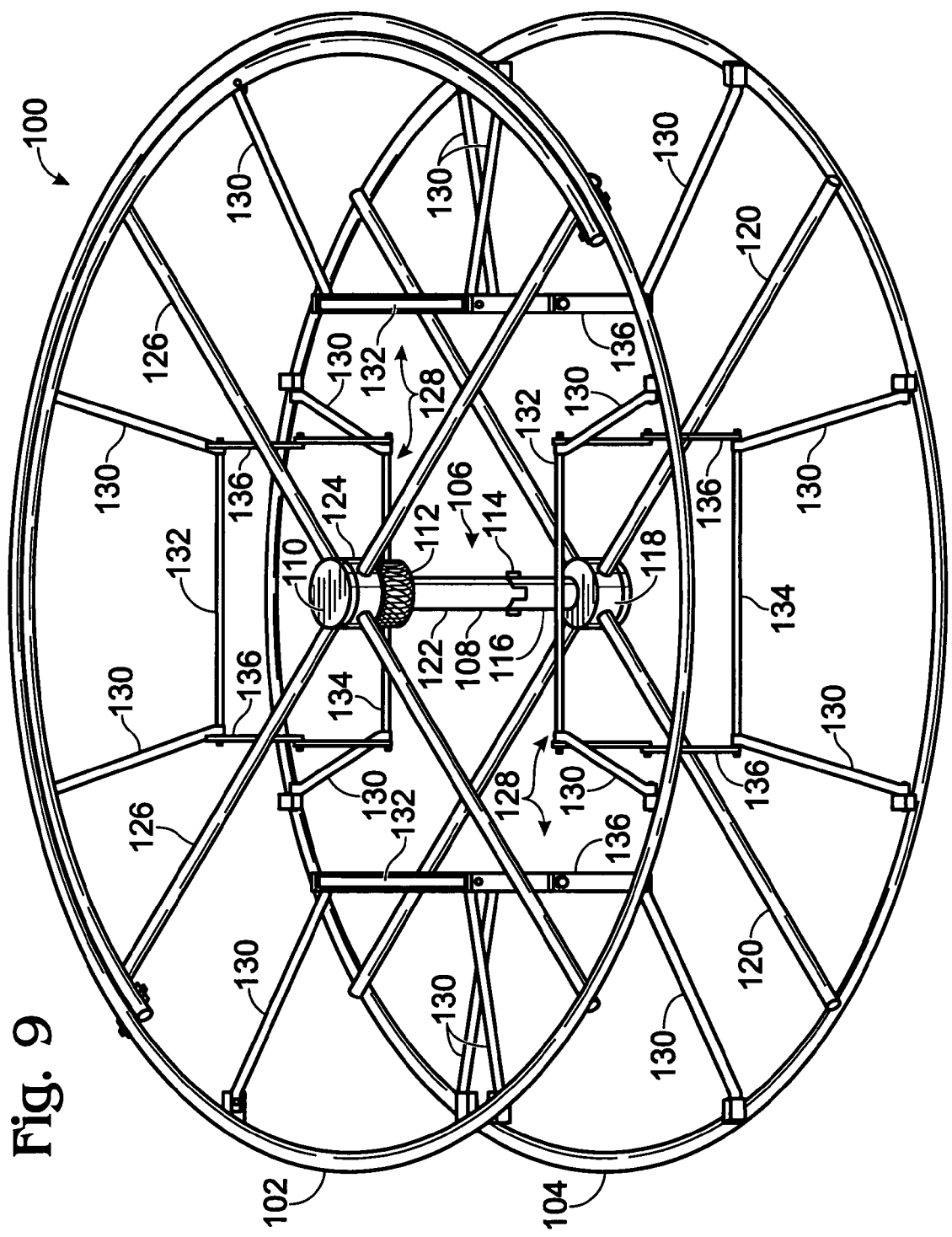
FIG. 9 is a perspective view showing an alternate embodiment of an assembled crab trap with its netting and harvest door removed, according to aspects of the present disclosure.

FIG. 9 shows an alternate embodiment 100 of a trap, in accordance with aspects of this disclosure. Trap 100 includes an upper perimeter 102, a lower perimeter 104, and a single central collapsible leg 106 disposed along the central axis of the trap. For clarity, trap 100 is shown with its top, bottom, and side walls removed, but in general these walls will be in place when the trap is fully assembled and ready for practical operation, so as to prevent escape of captured creatures.

Collapsible leg 106 includes an elongate support member 108, a head portion 110, a hollow engagement portion 112, and a hinge mechanism 114. A lower, or proximal portion 116 of the leg attaches to a base portion 118, which is connected to lower perimeter 106 with a plurality of lower radial struts 120. Struts 120 are securely attached to base portion 118 and to lower perimeter 104 by, for example, soldering, welding, or by integral formation with the lower perimeter. An upper, or distal portion 122 of elongate support member 108 is configured to pass through a sleeve 124 that is securely connected to upper perimeter 102 with a plurality of upper radial struts 126. Struts 126 are securely attached to sleeve 124 and to upper perimeter 102 by, for example, soldering, welding, or by integral formation with the upper perimeter.

Collapsible leg 106 may be used to selectively assemble and collapse trap 100, in a manner substantially similar to the manner in which collapsible legs 16 (depicted in FIGS. 1-4 and described above) may be used to assemble and collapse trap 10. More specifically, sleeve 124 is sized to allow passage of elongate support member 108 of the collapsible leg, but to prevent passage of head portion 110 of the leg. When the trap is in its assembled position, engagement portion 112 of the leg is configured to slide along the support member, and may be securely engaged with the support member by threading the engagement portion onto the distal portion of the support member. To facilitate this engagement, the interior of hollow engagement portion 112 may be threaded, and the exterior of distal portion 122 of the support member may be threaded in a complementary manner.

Engagement portion 112 is sized to prevent its passage through sleeve 124, so that when the engagement portion is engaged with the distal portion of the support member, it holds each sleeve 124 in fixed proximity to head portion 110 of the leg. Since lower and upper radial struts 120, 126 respectively rigidly connect the proximal and distal portions of the leg to the lower and upper perimeters, this also holds the upper perimeter of the trap at a substantially fixed distance from the lower perimeter, providing stable assembly of the trap. To collapse the trap, engagement portion 112 is unscrewed, so that both the engagement portion and hollow sleeve 124 may slide down the leg, past hinge 114 and towards base 118. When both engagement portion 112 and sleeve 124 are positioned between hinge 114 and base 118, upper perimeter 102 and lower perimeter 104 will be in relatively close proximity, and the leg may be folded over and into the common plane defined by the two perimeters.

Trap 100 also includes a plurality of tunnels 128 to allow entry into the trap by prey, but to prevent their egress. Tunnels 128 are connected to the upper and lower perimeters of the trap by a plurality of members 130, and may be rotatably connected in a manner similar to the connection of tunnels 34 to the upper and lower perimeters of trap 10 (see, e.g., FIGS. 1 and 2). Tunnels 128 also may include top, bottom and hinged side members 132, 134, 136, also similar in construction to the members of tunnels 34 of trap embodiment 10. When fully assembled, each tunnel 128 of trap 100 also may include a unidirectional gate similar to gates 60 of trap 10, and which are configured to collapse into the common plane of the perimeters when the trap is collapsed. Trap 100 also will include a screened top wall defined by its upper perimeter, a screened bottom wall defined by its lower perimeter, and a screened side wall. These features (not shown) may be substantially similar to the screened walls depicted in trap embodiment 10 shown in FIGS. 7-8, and may include walls with crossed strands having zero, one, or two sliding degrees of freedom and/or rotational freedom with respect to each other, as described above.

Figure 10:
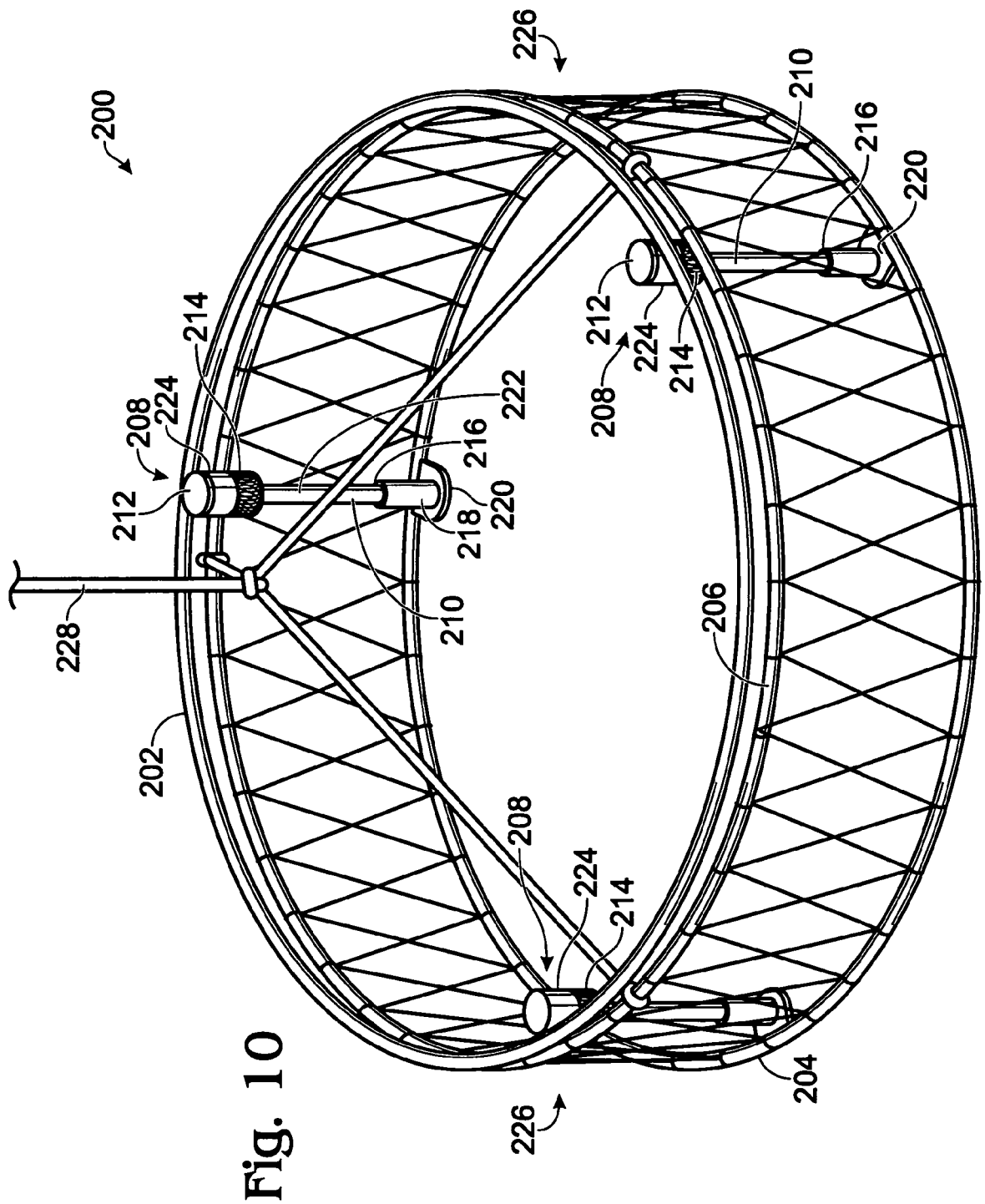
FIG. 10 is a perspective view showing another alternate embodiment of a live animal trap with its top and bottom walls removed for clarity, according to aspects of the present disclosure.

FIG. 10 shows another alternate embodiment 200 of a trap, in accordance with aspects of this disclosure. Trap 200 includes an upper perimeter 202, a lower perimeter 204, a middle perimeter 206, and a plurality of collapsible legs 208 disposed around the periphery of the trap. As indicated, in this embodiment, legs 208 may be disposed interior to perimeters 202, 204, and 206. For clarity, trap 200 is shown with its top and bottom walls removed, but in general these walls will be in place when the trap is fully assembled.

Each collapsible leg 208 of trap embodiment 200 includes an elongate support member 210, a head portion 212, a hollow engagement portion 214, and a hinge mechanism 216. A lower, or proximal portion 218 of each leg attaches to a base portion 220, which is connected to lower perimeter 204 in a secure fashion, such as by welding or by integral formation with the lower perimeter. An upper, or distal portion 222 of each elongate support member is configured to pass through a sleeve 224 that is securely connected to upper perimeter 202, for instance by welding or by integral formation with the upper perimeter.

Collapsible legs 208 may be used to selectively assemble and collapse trap 200, in a manner substantially similar to the manner in which collapsible legs 16 (depicted in FIGS. 1-4 and described above) may be used to assemble and collapse trap 10. More specifically, each sleeve 224 is sized to allow passage of elongate support member 210 of its associated collapsible leg, but to prevent passage of head portion 212 of the leg. When the trap is in its assembled position, engagement portion 214 of each leg is configured to slide along its associated support member, and may be securely engaged with the support member by threading the engagement portion onto the distal portion of the support member. To facilitate this engagement, the interior of hollow engagement portions 214 may be threaded, and the exterior of distal portions 222 of the support members may be threaded in a complementary manner.

Engagement portions 214 are sized to prevent their passage through sleeves 224, so that when each engagement portion is engaged with the distal portion of its associated support member, it holds each sleeve 224 in fixed proximity to head portion 212 of the leg. Since sleeves 224 and base portions 220 are respectively rigidly connected to the lower and upper perimeters, this also holds the upper perimeter of the trap at a substantially fixed distance from the lower perimeter, providing stable assembly of the trap. To collapse the trap, engagement portions 214 are unscrewed, so that both the engagement portions and hollow sleeves 224 may slide down their respective legs, past hinges 216 and towards base portions 220. When engagement portion 214 and sleeve 224 of each leg are positioned between hinge 216 and base 220, upper perimeter 202, lower perimeter 204, and middle perimeter 206 will be in relatively close proximity, and the legs may be folded over and into a common plane defined by the three perimeters.

As FIG. 10 depicts, middle perimeter 206 may be configured to slide freely along the exterior of legs 208. However, the middle perimeter has substantially the same diameter as upper and lower perimeters 202, 204, and is therefore bounded above and below by the upper and lower perimeters. In other words, although the middle perimeter is not directly attached to the legs of the trap, it is confined to the region between the upper and lower perimeters.

A screened side wall 226 is attached to lower perimeter 204 and middle perimeter 206, such that the side wall is raised and lowered in conjunction with the upward and downward movement of the middle perimeter. Thus, when the middle perimeter is in a lowered position (in relatively close proximity to the lower perimeter), the side wall also will be in a lowered position, allowing prey to enter the trap. However, when the middle perimeter is in a raised position (in relatively close proximity to the upper perimeter), the side wall also will be in a raised position, and prey will neither be able to enter or to leave the trap. Side wall 226 may include crossed strands having zero, one, or two sliding degrees of freedom with respect to each other, as described previously with respect to the other embodiments of the trap.

Middle perimeter 206, and thus side wall 226, may be raised and lowered by respectively applying and relaxing tension to a tension mechanism such as a cord or rope 228, which as depicted may have multiple strands attached to various points on middle perimeter 206. Rope 228 also may be used to conveniently lower trap 200 into the water and subsequently to retrieve it. After the trap has been lowered into the water and is resting on a solid underwater surface, tension in rope 228 may be relaxed, lowering middle perimeter 206 and side wall 226 and allowing prey to enter the trap. To retrieve the trap, the user pulls up on the rope, raising the middle perimeter and the side wall and trapping the prey while the trap is pulled up and out of the water.

Trap 200 also will include a screened top wall defined by its upper perimeter, and a screened bottom wall defined by its lower perimeter. These walls (not shown) may be substantially similar to the screened walls depicted in trap embodiment 10 shown in FIGS. 7-8 and described above.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or through presentation of new claims in this or a related application. Such claims, whether they are broader, narrower or equal in scope to the original claims, are also regarded as included within the subject matter of applicant's invention.

What is claimed is:

1. A collapsible live animal trap comprising:
    a first perimeter defining a boundary of a screened first wall;
    a second perimeter defining a boundary of a screened second wall;
    at least one collapsible tunnel operatively connected to the first and second perimeters and configured to collapse when the first and second perimeters are brought together, wherein the at least one tunnel includes top, bottom, and side members, and wherein each side member includes an intermediate hinge for facilitating collapse of the at least one tunnel; and
    at least one collapsible leg configured to separate the first and second perimeters when the trap is assembled, the leg including:
        an elongate support member attached to the first perimeter and configured to pass through a sleeve fixedly attached to the second perimeter; and
        an engagement portion configured to securely engage a distal portion of the support member with the sleeve so as to maintain separation between the first and second perimeters when the trap is assembled.

2. The collapsible trap of claim 1, further comprising a collapsible screened side wall extending between the first and second perimeters.

3. The collapsible trap of claim 2, wherein the side wall is formed from a plurality of substantially vertical strands and a plurality of substantially horizontal strands, and wherein the vertical strands have a sliding degree of freedom with respect to the horizontal strands.

4. The collapsible trap of claim 2, wherein the side wall is formed from a plurality of substantially vertical strands and a plurality of substantially horizontal strands, and wherein the vertical strands have rotational freedom with respect to the horizontal strands.

5. The collapsible trap of claim 4, wherein each vertical strand is passed through one of a plurality of hollow sleeves to form a first loop, and wherein each horizontal strand is passed through another of the hollow sleeves to form a second loop intersecting the first loop.

6. The collapsible trap of claim 5, wherein each sleeve is held substantially fixed in place along the strand passing through it by friction.

7. The collapsible trap of claim 1, wherein the at least one leg further includes a distal head portion attached to the support member and having dimensions configured to prevent the head portion from being pulled through the sleeve.

8. The collapsible trap of claim 1, wherein the elongate support member, the sleeve, and the engagement portion are all substantially cylindrical, and wherein the engagement portion has an internal diameter smaller than an external diameter of the sleeve.

9. The collapsible trap of claim 1, wherein the engagement portion is internally threaded, and the distal portion of the support member is externally threaded in a complementary manner.

10. The collapsible trap of claim 1, wherein the first and second perimeters each are substantially circular.

11. The collapsible trap of claim 10, wherein the at least one collapsible leg includes a plurality of collapsible legs disposed around a periphery of the trap.

12. The collapsible trap of claim 10, wherein the at least one collapsible leg includes a central collapsible leg connected to the first and second perimeters with a plurality of radial struts.

13. The collapsible trap of claim 1, wherein the elongate support member has a hinge mechanism configured to allow the leg to fold substantially into a plane defined by the first and second perimeters when the trap is collapsed.

14. The collapsible trap of claim 13, wherein the hinge mechanism is disposed such that the engagement portion and the sleeve may be positioned between the first perimeter and the hinge mechanism to facilitate collapse of the trap.

15. The collapsible trap of claim 1, wherein the at least one collapsible tunnel is connected to the perimeters with a plurality of attachment members configured to rotate substantially into a plane defined by the first and second perimeters when the trap is collapsed.

16. The collapsible trap of claim 1, further comprising at least one wirekeeper mechanism attached to one of the side members and configured to secure a plurality of strands of netting that form a portion of a collapsible screened side wall.

17. The collapsible trap of claim 16, wherein the at least one wirekeeper mechanism includes a wirekeeper mechanism attached to each side member.

18. The collapsible trap of claim 1, further comprising a unidirectional gate attached to the at least one tunnel, and wherein the gate is configured to rotate substantially into a plane defined by the first and second perimeters when the trap is collapsed.

19. The collapsible trap of claim 18, wherein the gate includes at least one laterally extending member configured to be contacted by one of the side members of the at least one tunnel when the trap is collapsed, such that the gate rotates substantially into a plane defined by the first and second perimeters when the trap is collapsed.

20. The collapsible trap of claim 19, wherein the at least one laterally extending member includes a pair of laterally extending rods disposed on opposite sides of the gate, each rod having a distal end that overlaps one of the side members of at least one the tunnel.

21. The collapsible trap of claim 1, further comprising a door portion which is rotatable out of a plane defined by the first perimeter, to provide access to an interior portion of the trap.

* * * * *